INVENTOR.
RICHARD T. BURNETT
BY Cecil T Arens

ATTORNEY

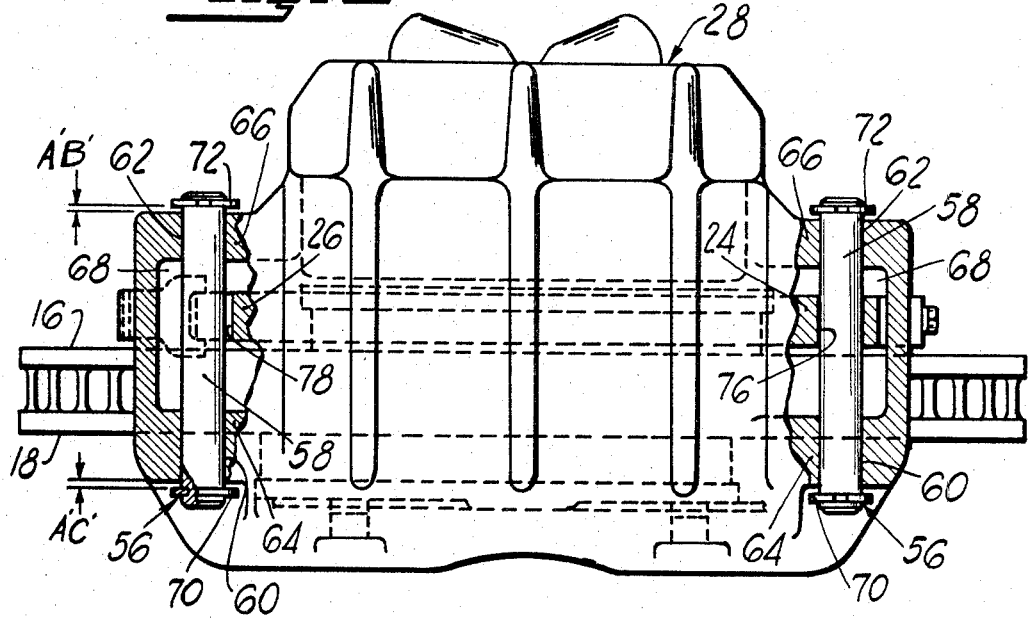
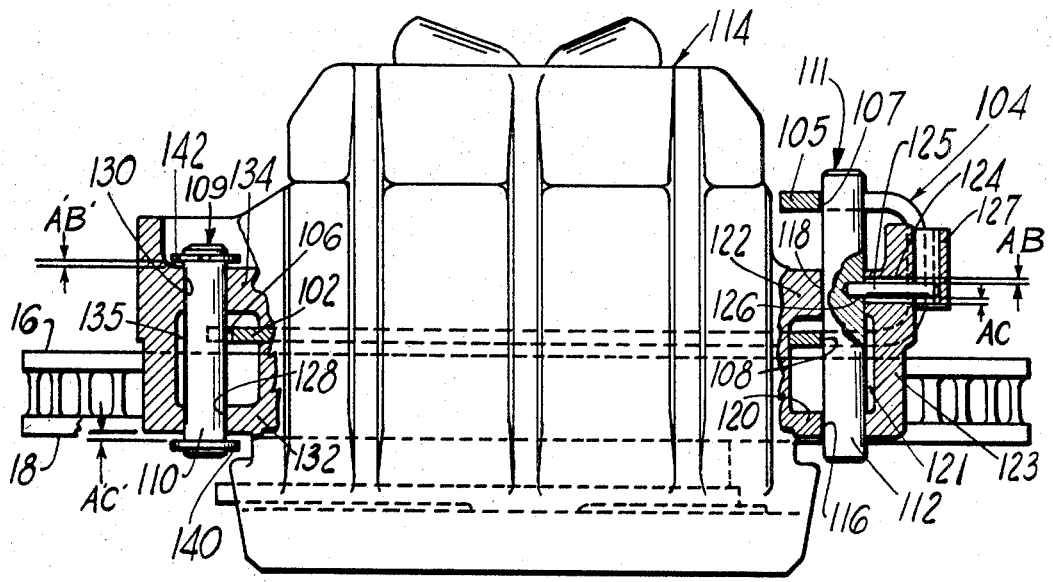

INVENTOR.
RICHARD T. BURNETT
BY
ATTORNEY

INVENTOR.
RICHARD T. BURNETT
ATTORNEY 3,410,371
SUPPORT AND ADJUSTING MEANS FOR
DISC BRAKE CALIPER
Richard T. Burnett, South Bend, Ind., assignor to The
Bendix Corporation, a corporation of Delaware
Filed Jan. 27, 1967, Ser. No. 612,238
11 Claims. (Cl. 188—73)

ABSTRACT OF THE DISCLOSURE

A floating head type of disc brake in which an actuator housing is slidably and adjustably carried on bearing members in straddling relationship to a rotor disc for transverse movement with respect to said disc for engagement therewith to perform a braking function, which, when completed, results in repositioning said housing on its bearing members if there has been friction lining wear in excess of a given amount, to thereby maintain the desired relationship between the faces of the rotor disc and the friction lining.

Background of the invention

This invention relates specifically to a vehicle disc brake of the type commonly known in the art as a "floating head" disc brake to distinguish it from fixed head disc respect to the rotor so as to maintain the friction elements scribed, the housing is mounted for sliding action on a fixed support member transversely to a rotor disc for braking engagement therewith.

Summary

Accordingly, one of the principal objects of this invention is to provide a floating head type of disc brake which provides for transverse adjustment of the housing with respect to the rotor so as to maintain the friction elements adjacent the rotor surfaces to insure minimum pedal travel during a brake application.

Another object of the invention is to provide a floating head type disc brake provided with a cylinder housing which straddles a rotor member and is slidingly secured to a torque member for relatively free transverse sliding movement within given limits toward and away from the rotor surface to accommodate for lateral rotor displacement but resisting further movement beyond said limits by a predetermined resistive force which, when overcome, repositions said housing with respect to said support.

A still further object of the invention is to provide a disc brake of the floating head type which insures parallel friction lining wear.

A further object of the invention is to provide connecting means between a torque taking member and a floating head caliper housing which provides for relatively free sliding action between the housing and the torque member within certain limits of movement in order to allow adjustment of the housing transverse to the rotor faces to accommodate for lateral rotor displacement against the friction elements but resisting movement of said housing beyond said limits by a preselected resistive force which, when overcome, repositions said housing on said torque member.

An important object of this invention is to provide anti-rattle springs for a floating head type caliper housing which do not interfere with the free sliding movement of said housing on its torque taking member.

Another very important object of this invention is to provide a single piston caliper brake wherein the piston is carried in a housing which carries two circumferentially spaced pins supported by a respective pair of circumferentially spaced torque taking members, the combination including independent spring means for each of said pins adjustably securing said pins for sliding action upon operative engagement by said housing.

A still further object of this invention is to provide a caliper brake which is simple in construction and economical to manufacture, and still does not sacrifice performance, resistance to fade and fluid boiling.

A more complete understanding of the invention may be had from the following detail description with reference to the accompanying drawings, wherein:

Brief description of the drawings

FIGURE 3 is a top plan view of the brake of FIGURE 1 with sections cut away, illustrating certain novel aspects of the brake;

FIGURE 5 is a top plan view of a modified form of the invention with sections cut away, demonstrating the details of this form of the invention;

Description of the preferred embodiment

Figure 4:
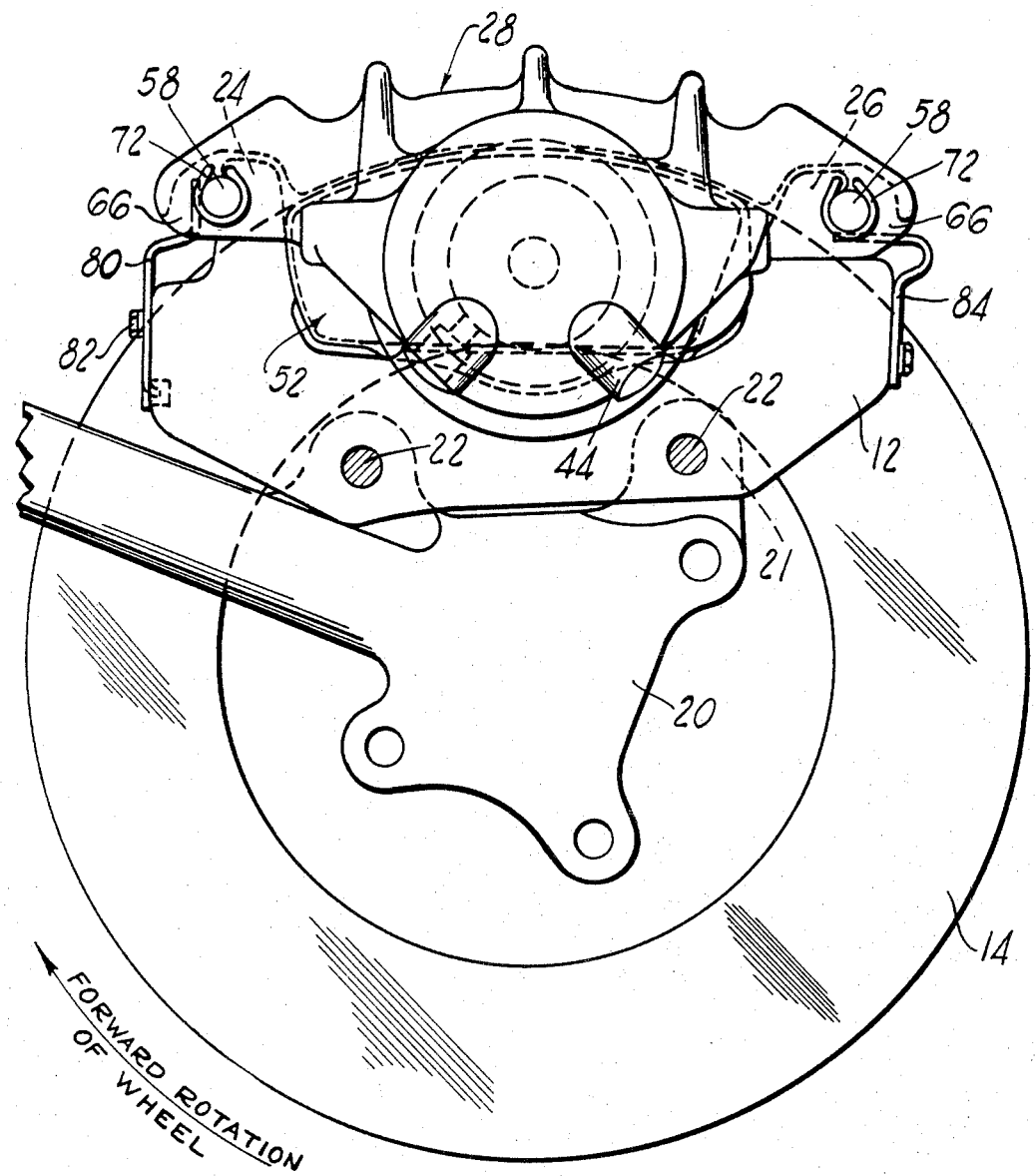
FIGURE 4 is a side elevational view of the brake of the invention of FIGURE 1 taken from the inboard side, showing how the brake is fastened to the front spindle of a vehicle.

Referring now to the drawings, there is illustrated a torque taking member 12 located on one side of a rotor 14, the latter of which is formed with annular opposed friction faces or surfaces 16 and 18. The rotor is securely fastened to a wheel 13 and hub 15 by bolts 19. The torque taking member is secured to a fixed part of a vehicle, in this case a spindle 20 having mounting bosses 21 by bolts 22 which extend through the torque member and mounting bosses for engagement with the spindle. The torque taking member, which, as aforementioned, is secured to a stationary part of the vehicle, is equipped with a pair of circumferentially spaced arms 24 and 26, as best shown in FIGURE 4. The arms 24, 26 are integral with the torque member 12. The housing 28 straddles the rotor and is slidably mounted on the torque taking member 12 for movement in a direction transverse to the rotor faces, i.e., in a direction along the axis of said rotor toward and away from said rotor faces. The housing 28 includes an inwardly radially extending portion 29 overlying a portion of one of said rotor faces and another portion 30 extending radially inwardly on the other side of said rotor face and overlying a portion only of said rotor face. The radial portions 29 and 30 are joined together by a bridge member 31 to thereby provide a housing made of a single casting. In order to impart transverse movement to said housing, an actuator 32 is located in the radially inwardly extending portion 29, comprising a piston 34 slidably received in a bore 35. A seal 36 is located in a groove 38 of the bore 35 to seal chamber 40 against the escape of fluid therefrom through the open end of the bore. The open end of the bore 38 is sealed against the admission of foreign matter by a rubber boot 42 which has one end connected to the housing and its other end connected to the piston 34.

In order to maintain the friction elements, to be hereinafter described, in close proximity to the faces of the rotor but out of force contact therewith, there is established a very definite dimensional relationship with respect to the outside diameter of the piston 34, the bore 35, the size of seal 36, and the dimensions of the groove 38. That is, the relationship between these parts is such that the magnitude of the frictional contact force between the seal 36 and pistn 34 controls the position of the piston in each new position as it moves toward the rotor as a result of lining wear.

Hydraulic pressure from a master cylinder, not shown, is communicated to chamber 40 through an inlet port 44. A first friction element 45 is carried by the radial portion 30 of the housing 28 and lies adjacent one face of the rotor in proximate relationship thereto. The friction element 45 is removably attached to the radial portion 30 by inserting projections 46 formed integral with the friction element into openings 48 of said radial portion 30. As disclosed in the drawing, FIGURE 2, the friction element 45 includes a backing plate 50 and friction lining 51.

Figure 2:
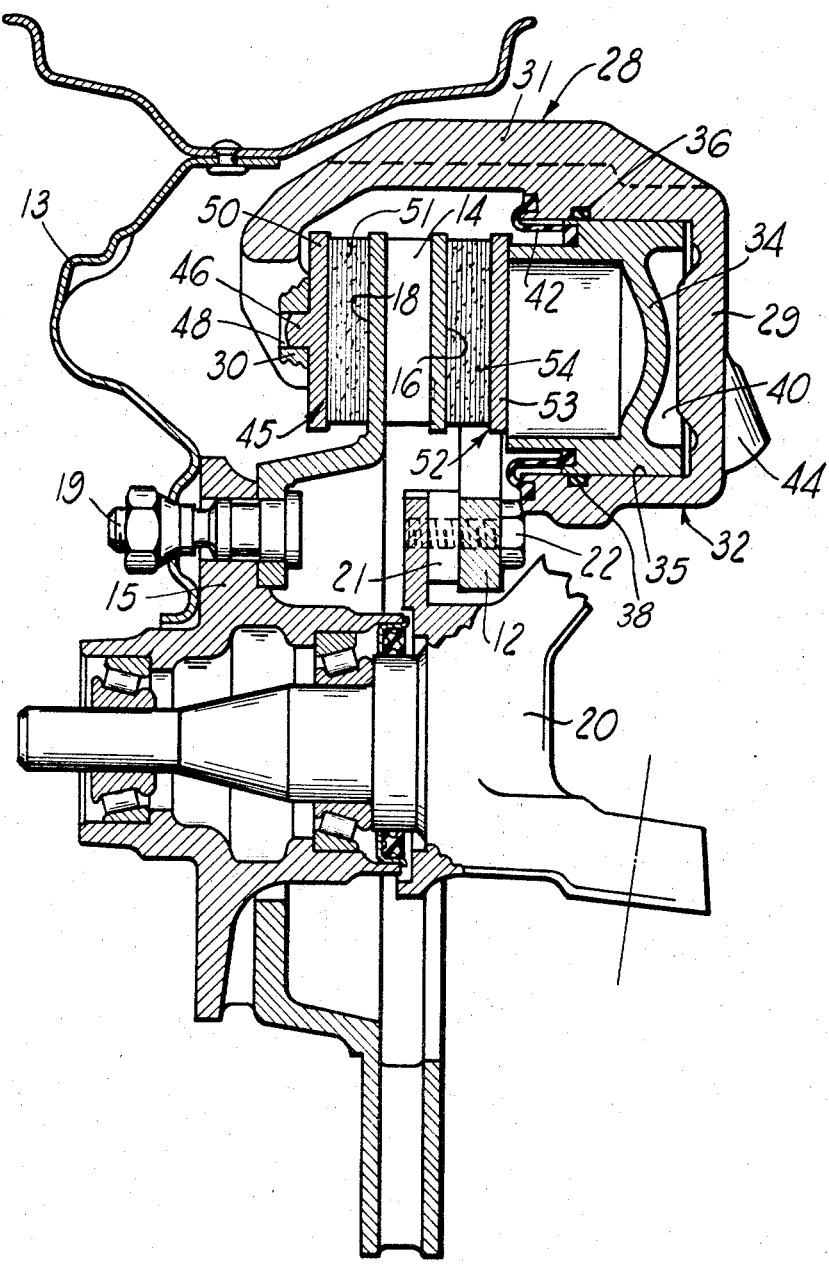
FIGURE 2 is a view in section taken along the line 2—2 of FIGURE 1.

As illustrated best in FIGURES 2 and 4, the torque taking member 12, which forms a fixed part of the vehicle, slidably supports a second friction element 52 carried between the spaced arms 24, 26 for frictional engagement with a side of the rotor face opposite to the side engaged by said first friction element 45. The friction element 52 includes a backing plate 53 and a friction lining 54. It is to be understood, of course, that the friction elements 45 and 52 might very well be of one piece construction if the friction material to be used were sufficiently adequate structurally to take the compressive and bending forces without the aid of the backing plates.

As best shown in FIGURE 2, the piston 34 of the actuator is positioned adjacent the friction element 52 for moving said element into frictional engagement with the rotor 14 upon energization of the fluid motor or actuator 32. The housing 28 straddles the rotor 14 with the radially extending portions 29 and 30 adapted to overlie the opposed faces of the rotor 14. The friction elements 45 and 52 are interposed between opposed faces of said rotor and the respective radial portions 29 and 30 of the housing 28. The actuator 32 is operatively connected to the friction element 52 through the piston 34 and to the friction element 45 through the housing 28 so that pressurization or the chamber 40 imparts movement to the friction elements 45 and 52 causing them to frictionally engage the faces of rotor 14. The housing 28 straddles the rotor 14 and is supported on the torque taking member 12 by means or bearing members 56 which provides for sliding movement of said housing with respect to said torque taking member in a direction transverse to said rotor faces. This means 56 which connects each of the circumferentially spaced arms to the housing 28 for sliding action transverse to the rotor faces allows for a given amount of free movement of said housing with respect to said support member in order to accommodate the housing to the lateral displacement of the rotor acting against the friction elements but offering a predetermined resistive force to further movement of said housing with respect to said support member when movement of said housing is in excess of said given amount of movement which, when overcome, repositions said housing with respect to said support member. Specifically referring to the cut away sectional portions at each side of FIGURE 3, the means 56, slidably connecting the housing 28 to the torque taking member 12, comprises a pin element or shaft member 58 received in openings 60 and 62 of rib members 64 and 66, respectively, of said housing. The fit between the pin elements 58 and the openings 60, 62 is such that the housing 28 can slide freely on these elements. The rib members 64, 66 are formed on the underside of the housing 28 in spaced parallel relationship to provide spaces 68 between the rib members so as to accommodate the circumferentially spaced arms 24, 26 which support the pins or shafts 58, forming bearing members between the housing and torque taking member. Each pin element 58 is provided with abutment elements 70 and 72 located in spaced relation along the axis of the pin element and adjacent the ends thereof for engagement with the ribs 64, 66 as the housing slides on the pin elements in a direction transverse to the rotor faces. Since the abutments 70, 72 must withstand sufficient axial loading imparted to them by the housing 28 to cause shifting of the pins in their respective circumferentially spaced arms 24, 26, the abutments or elements 70, 72 must be securely affixed to the pins 58 as shown in FIGURE 3. One such expedient for attaching the abutments 70, 72 to the pin 58 is achieved by forming grooves in the opposed ends of the pins and forcing C-washers into the grooves. This arrangement holds the abutments securely in place so as to withstand any loading imparted thereto by the housing.

Figure 1:
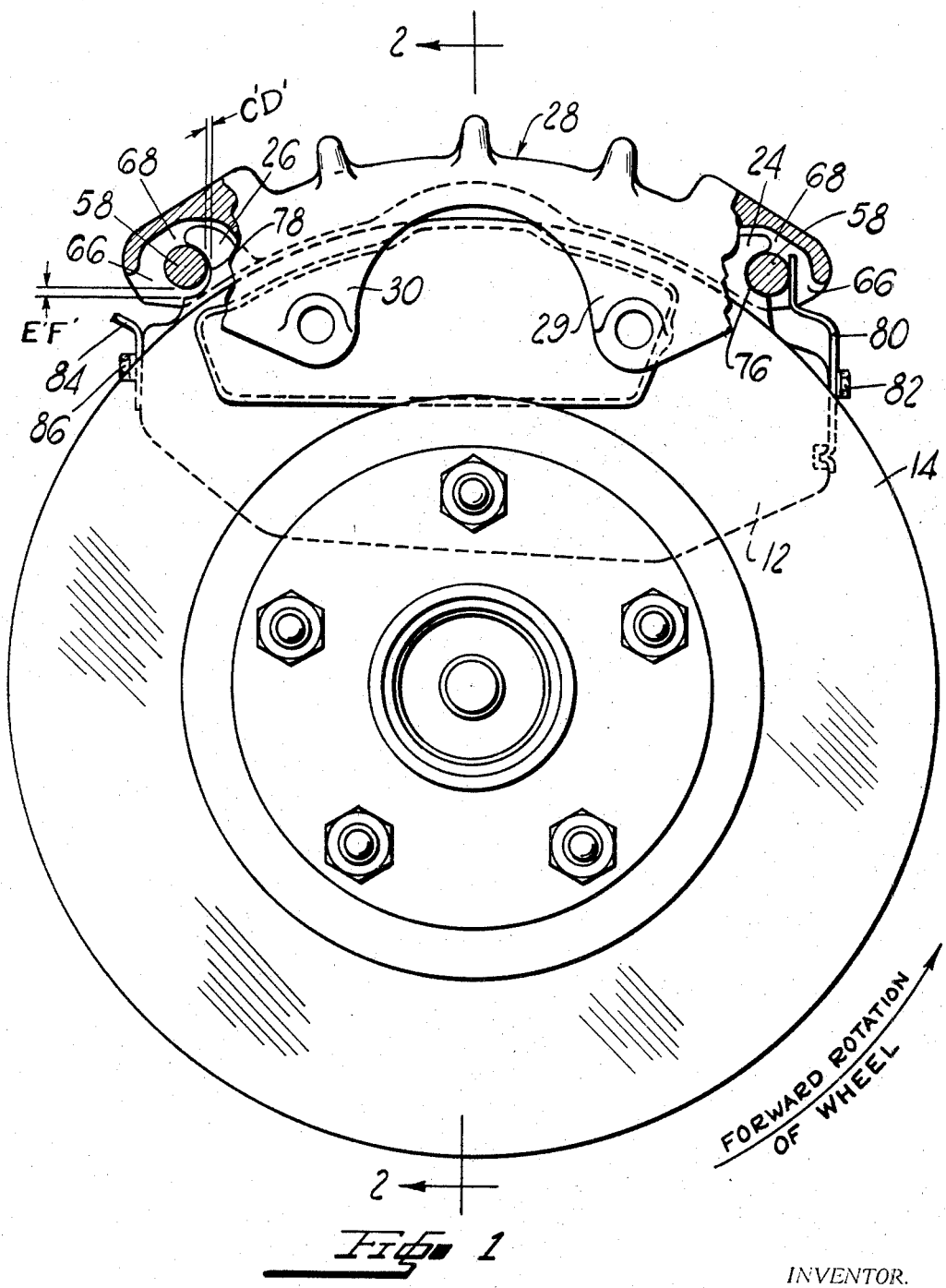
FIGURE 1 is an elevational front view of a preferred embodiment of the invention taken from the outboard side as mounted on a vehicle.

With particular reference to FIGURE 1, the arms 24, 26 are provided with openings 76 and 78, respectively, for receiving the pins 58. The spacing between the openings 76 and 78 of the circumferentially spaced arms 24, 26 is such that when the pin 58, with reference to FIGURE 1, is in frictional engagement with the inner edge of opening 76, there is a space C'D' between the inner surface of opening 78 and the adjacent side of pin 58. However, the spacing of the openings 76, 78 with respect to the circumferential spacing of the pins 58 in the housing is such that the housing is locked to the torque taking member by these pins 58. It will be observed that any attempt to rotate the housing about the pin on the right side as viewed in FIGURE 1 will rotate the pin 58 on the left into engagement with circumferentially spaced arm 26. Assembly of the housing to the torque taking member may be accomplished by positioning one of said pins 58, for example, the one on the right in FIGURES 1 and 3, in its respective openings in the ribs of the housing and the opening 76 of the torque taking member, and then rotating the housing until the openings 60, 62 in the ribs at the opposite side of the housing, on the left in FIGURES 1 and 3 are in alignment with the other opening 78 of the torque taking member, at which time the other pin 58 is pushed into the aligned holes. The pin 58 is shoved into the openings of the housing from either side a distance that will expose the groove on the other side in order that one of the C-washers, depending upon which one is removed, can be forced into place in its associated groove.

The space C'D' is, of course, due to a stack-up of tolerances in manufacturing the parts. A leaf spring 80 has one end securely attached to the support member 12 by a bolt 82. The other end of the spring 80, which is the free end, rides on the outer surface of the pin 58 to thereby urge the pin into bearing relationship to the arm 24 and also urging the housing 28, which carries the pin, in a counterclockwise direction with respect to FIGURE 1, causing the gap C'D'.

A second leaf spring 84 is mounted on the torque taking member on the opposite end of the torque taking member from the spring 80 by a bolt 86. The free end of the second spring 84 is mounted so as to engage the underside of the pin 58, thereby urging the pin, together with the housing 28 on which the pin is mounted, upwardly against the circumferentially spaced arm 26 creating the space E'F' between the underside of the pin and the lower inner surface of the opening 78 in the arm 26. This spring likewise acts as an antirattle spring intended to compensate for a stack-up of tolerances existing between the diameter of the pin 58 and the diametrical opening 78.

In addition to functioning as antirattle springs, the springs 80, 84 urge the pins 58 into engagement with their respective circumferentially spaced arms 24, 26. This preload by the springs 80, 84, on the shafts 58 adjustably secures the shafts in their respective arms. The springs 80, 84 are preselected so as to apply sufficient loading on the pins 58 in their respective arms to resist sliding movement of the bearings in the torque taking member up to a predetermined force imparted to the bearing members due to transverse movement of the housing 28 as a result of excessive rotor displacement or due to normal friction lining wear which will cause the bearing members to slide in their respective arms to thereby reposition the housing with respect to the torque taking member. In assembling the torque taking member and housing to a vehicle wheel, the bearing members 56 are positioned in their respective arms 24, 26 so that the abutments 70, 72 located at the ends of the pin provide substantially equal spacing A'B' and A'C' between the abutments 70 and 72 and their respective adjacent ribs 64, 66. With the spacings A'B' and A'C', as shown in FIGURE 3, any normal lateral rotor displacement during nonbraking conditions will only shift the housing transversely with respect to the rotor faces taking up the spaces A'B' and A'C' on the respective pins 58. This sliding action of the housing 28 on the pins 58 is substantially free of any resistive force, except for friction between the bearing members and the ribs of the housing in which they slide. In other words, the housing shifts freely back and forth transversely of the rotor member until such time as the housing engages the abutment 70 or 72 with sufficient force to overcome the preload of the springs on the bearing members, at which time the pins are shifted on the torque taking member to thereby reposition the housing. This shifting or sliding of the pins will take place upon friction pad wear or lateral rotor displacement beyond an amount in excess of the spacings A'B' and A'C'. It is important that the housing be repositioned transversely to the rotor surface due to lining wear so as to maintain the friction elements 45 and 52 in close proximity to the rotor faces to thereby maintain fluid displacement in chamber 40 to a minimum, thus maintaining minimum pedal travel.

Operation

With the direction of rotation of the rotor 14 in a clockwise direction as indicated in FIGURE 4, pressurization of chamber 40 (see FIGURE 2) will move the piston 34 and associated friction element 52 to the left, and the housing 28 and associated friction element 45 to the right, thereby clamping the rotor 14 between the two friction elements. Specifically, this clamping effect of the friction elements on the rotor 14 is brought about by pressurization of the fluid in chamber 40. The pressure build-up in chamber 40 acts on the back side of the piston 34 urging it to the left and on the end wall 29 of the housing 28 causing it to slide on the bearing members 56, thus bringing the opposed friction elements 45 and 52 into frictional engagement with the rotor faces.

It is to be noted that if the amount of transverse movement of the housing 28 on the bearing members 56, in response to a brake application, does not exceed the spacing A'B' so that the housing 28 does not engage the abutments 72, the pins 58 will not be shifted in their respective arms against the preload of the springs 80 and 84 (see FIGURE 3). However, if a brake application should produce measurable wear on the friction element 45, such that the housing 28 engages the abutments 72 with sufficient force of impact to overcome the preload between the pins 58 and the torque taking member, the pins will shift in their respective arms, thus causing the housing 28 to be repositioned on the torque taking member. This action, which causes the housing to shift transversely an amount in excess of the spacing A'B', compensates for wear of lining member 51 to thereby maintain fluid displacement, hence, pedal travel, to a minimum at all times. As to the wear on lining 54 of friction element 52, brake lining wear is compensated for by establishing a dimensional relationship with the diameter of the piston 34, the bore 35, the size of seal 36 and the dimensions of the groove 38, such that the magnitude of the frictional contact force between the seal 36 and the piston 34 controls the position of the piston in each new position as it moves to the left against the rotor if there has been lining wear. In other words, the dimensional relationship of the parts is such that the piston 34 will at all times be maintained to the left in FIGURE 2, which again keeps fluid displacement, hence, pedal travel, to a minimum. The arrangement of the seal 36 in groove 38 is such that upon release of pressure from the chamber 40, the seal 36, which has been stressed in the groove 38 by the piston as it moves to the left, will return the piston to the right a slight amount due to the return of the seal 36 to its unstressed condition. This keeps the lining 54 in the same relationship to the rotor face 18 at all times. Should a brake application produce wear on linings 54 which causes the piston to overcome the frictional force between the seal and piston the piston will merely slide in the seal the required amount to compensate for wear. In this event, the piston will likewise be returned to the right a slight amount due to the return of the seal to its unstressed position.

Description of modified embodiment

Figure 6:
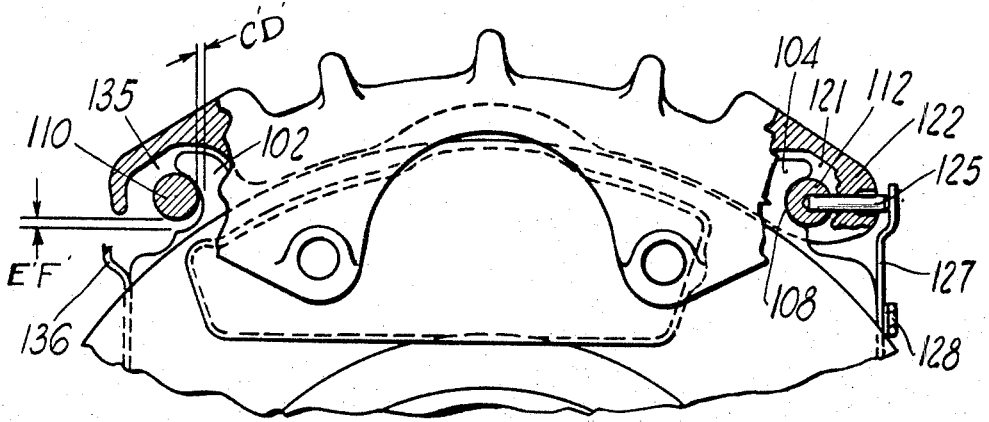
FIGURE 6 is an elevational front view of the disc brake of FIGURE 5 with portions cut away to demonstrate more clearly the details of the modified form of invention.
Figure 7:
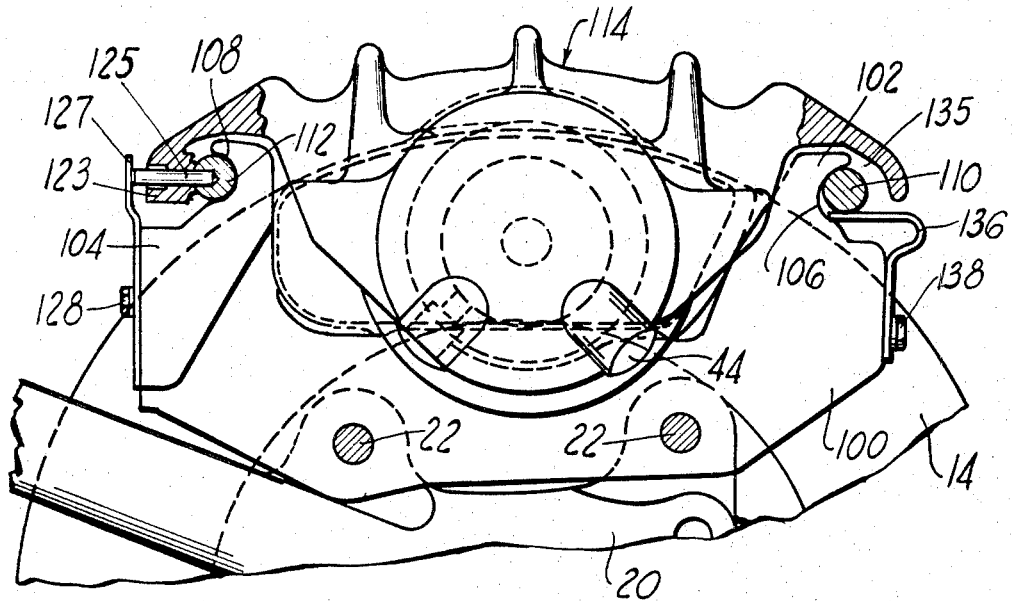
FIGURE 7 is a side elevational view of the brake shown in FIGURE 5 taken from the inboard side, with portions cut away for illustrating more clearly the connecting means between the housing and torque member.

FIGURES 5, 6 and 7 illustrate a disc brake utilizing a modified concept of FIGURES 1 and 3 for slidably connecting the housing to the torque taking member. In describing the modified embodiment, those parts shown in the FIGURES 5, 6 and 7 identical to the parts of the preferred embodiment, will be designated by the same numerals. As best shown in FIGURE 7, a torque taking member 100 is attached to a fixed part of the vehicle, such as the spindle 20, which is provided with mounting bosses 21 for receiving bolts 22 which extend through the torque taking member to securely attach the latter to said spindle as aforementioned. The torque taking member 100 is attached to the spindle 20 adjacent one side of rotor 14, which is equipped with annular opposed friction faces or surfaces 16 and 18. The rotor is mounted to a wheel 13 and a hub 15 by a series of circumferentially spaced bolts 19, only one of which is shown. The torque taking member 100 is formed with two circumferentially spaced arms 102 and 104, having openings 106 and 108 for receiving a means or bearing members 109 and 111, respectively, on which a housing 114 is carried in straddling relationship to the rotor 14 for transverse movement with respect to the faces of said rotor. Except for the structure employed in slidably securing the housing 114 to the torque taking member 100, which will be hereinafter described, the housing 114 is structurally the same as the housing 28, particularly with respect to the construction and arrangement of the piston 34 and the mounting of the friction elements 45 and 52.

With particular reference to FIGURE 5, the means or bearing member 111 includes a pin 112 which is carried in axially spaced openings 116 and 118 of rib members 120 and 122, respectively, of the housing 114. The ribs 120, 122, which are located in a generally parallel position with respect to each other are connected by a transversely extending rib 123. The rib 123 is formed with an opening 124 which communicates the external portion of the rib with the opening 118 in the rib 122, in which the pin 112 is slidably received for limited transverse movement. The opening 124 is of such a diameter with respect to the diameter of pin or abutment 125 that the housing 114 can slide freely on the pin 112 an amount from a central position between the pin and the sides of the opening 124, equal to the distances AB or AC before there is engagement between the housing and pin 125. Thus, means or bearing member 111 is comprised of a pin element 112 and abutment element 125. The pin 125, which functions as an abutment for engagement of the housing 114 as it slides on the pin 112, has its inner end tightly fitted into a hole 126 of the pin 112 so as to provide a driving connection between the latter and the housing 114. The pin or abutment 125 protrudes beyond the transverse rib 123 for engagement with a leaf spring 127 securely affixed to the torque taking member at one end by a screw 128. The spring preloads the pin 112 against the inner wall of the opening 108 of the torque taking member 100. The spring also acts as an antirattle spring to compensate for the stack-up of manufacturing tolerances of the parts. It will be noted that the circumferentially spaced arm 104 of the torque taking member is J-shaped, in construction so as to provide for additional guiding of the pin 112. That is, the circumferentially spaced arm 104 is formed with an end portion 105 which is folded back over the main body of the torque taking member 100 so as to form a generally J-shaped member, with the folded over portion 105 having an opening 107 which receives an end on the pin 112. The openings 108 and 107 are in axial registraton in the two portions of the arm 104 so as to allow the pin 112 to slide transversely to the rotor faces.

The means or bearing member 109 which includes a pin 110 which is carried in openings 128 and 130 of ribs 132, 134, respectively, of the housing 114. The ribs 132, 134 are spaced apart in generally parallel relationship to provide a space 135 on the underside of the housing into which the circumferentially spaced arm 102 projects. In a similar manner, with reference to FIGURE 5, the ribs 120 and 122, located at the right end of the housing, are spaced apart in parallel relationship to form a space 121 into which that part of circumferentially spaced arm 104 which lies adjacent the rotor surface projects. The pin 110 is urged against the spaced arm 102 by a spring 136, having one end attached to the torque taking member by a screw 138. The spring 136 is formed with its free end at right angles to the fixed end of the spring so that the free end lies along the underside of the pin 110, urging the same upwardly against the upper side of the opening 106. Abutments 140 and 142 are located at opposite ends of the pin 110 for engagement by the ribs 132 and 134, respectively, of the housing 114. Thus, means or bearing member 109 is comprised of pin element 110 and abutment elements 140 and 142. The abutments 140 and 142 are spaced from the adjacent ribs 132 and 134, respectively, a distance A'B' and A'C' such that free sliding action of the housing 114 on the pin 110 is permitted due to normal displacement of the rotor 14 against the friction elements carried by the housing 114 so long as the displacement is not in excess of the clearances A'C' and A'B'. The spacings A'B' and A'C' between the abutments 140 and 142 and the housing 114 are the same respectively as the spacings AB and AC between the abutment 125 and the housing 114.

When the housing 114 is in assembled position on the torque taking member 100, the spring 136 urges the pin 110 against the upper side of the hole or opening 106, thus leaving a space E'F' between the lower end of the hole or opening 106 and the under side of the pin 110 (see FIGURE 6). This space E'F' is due to stack-up of tolerances of the parts which must result in an oversize opening to facilitate assembly. Also, the space C'D' between the inner surface of the pin 110 and the inner surface of the opening 106 is the result of a stack-up of tolerances of parts and is likewise oversize to facilitate assembly of the housing onto the torque taking member. The space C'D' represents the clearance existing due to tolerance stack-up when the pin 112 is urged against the inner edge of the hole 108 by the leaf spring 127.

I claim:

1. In a disc brake: a rotor having two friction faces, one on each side of said rotor, a torque taking member located at one side of said rotor and having two circumferentially spaced arms, a caliper housing straddling said rotor, a pair of friction elements one located adjacent each of said friction faces and operatively connected to said housing for frictional engagement with said faces, means connecting said housing and torque member for sliding movement of said housing with respect to said torque member in a direction transverse to said faces, said means including two bearing members carried by said housing, each of said bearing members mounted for sliding movement on a respective one of said two circumferentially spaced arms and comprising two elements, one of said elements is in sliding contact with said torque member and slidingly supporting said housing and the other of said elements is carried by said one element in spaced relationship to said housing for engagement by said housing to thereby reposition said housing transversely to said faces to compensate for wear of the friction elements.

2. The structure as recited in claim 1, wherein said bearing members are spring loaded laterally to said sliding movement of said bearing members for sliding adjustment on said torque member.

3. The structure as recited in claim 1 wherein said one element is a pin slidably mounted on said housing for predetermined relative movement with respect thereto.

4. The structure as recited in claim 1, wherein one of said bearing members comprises a pin and a single abutment to be engaged by said housing upon transverse movement thereof in either direction and the other of said bearing members comprises a pin and two abutments positioned at axially spaced locations, one of said two abutments to be engaged by said housing upon transverse movement thereof in one direction and the other of said two abutments to be engaged by said housing upon transverse movement thereof in the other direction.

5. The structure as recited in claim 1 wherein said torque taking member is J-shaped in cross section, with the loop end of the J providing one of said circumferentially spaced arms.

6. The structure as recited in claim 1, wherein each bearing member is independently spring loaded laterally to said sliding movement of said bearing member and against torque member to provide for adjustment of said bearing members transverse to said rotor faces.

7. The structure as recited in claim 1, wherein resilient means fixed to said torque member preloads said bearing members laterally to said sliding movement of said bearing members and against said torque member, said resilient means thereby providing an anti-rattle function and also offering a predetermined resistance against repositioning of said one element relative to said torque member.

8. The structure as recited in claim 1, wherein said circumferentially spaced arms have openings therein each slidably receiving a respective one of said one element which is adjustably secured to and in sliding contact with said torque member for sliding movement thereon upon engagement of said other element by said housing as a result of wear of said friction elements.

9. The structure as recited in claim 1, wherein the other of said elements of one of said two bearing members comprises a single abutment to be engaged by said housing upon transverse movement thereof in either direction and the other of said elements of the other of said two bearing members comprises two abutments, one abutment to be engaged by said housing upon transverse movement thereof in one direction and the other abutment to be engaged by said housing upon transverse movement in the other direction.

10. The structure as recited in claim 1, wherein said other element comprises an abutment to be operatively engaged by said housing after predetermined movement thereof to thereby impart sliding movement to said one element.

11. The structure as recited in claim 10, wherein there are two of said abutments on said one element positioned at axially spaced locations on said one element to be engaged by said housing after predetermined transverse movement thereof.

References Cited

UNITED STATES PATENTS 2,531,341  11/1950  Meador.
3,155,194  11/1964  Gancel _____ 188—73

FOREIGN PATENTS 1,187,506  2/1965  Germany.

MILTON BUCHLER, *Primary Examiner.*

G. E. A. HALVOSA, *Assistant Examiner.*